(12) United States Patent
Matsuo

(10) Patent No.: US 9,134,525 B2
(45) Date of Patent: Sep. 15, 2015

(54) OCULAR OPTICAL SYSTEM AND OPTICAL APPARATUS

(75) Inventor: Taku Matsuo, Kawasaki (JP)

(73) Assignee: Nikon Corporation, Tokyo (JP)

( * ) Notice: Subject to any disclaimer, the term of this patent is extended or adjusted under 35 U.S.C. 154(b) by 453 days.

(21) Appl. No.: 13/409,610

(22) Filed: Mar. 1, 2012

(65) Prior Publication Data

US 2012/0224271 A1 Sep. 6, 2012

(30) Foreign Application Priority Data

Mar. 1, 2011 (JP) ................................ 2011-043729
Mar. 1, 2011 (JP) ................................ 2011-043734
Feb. 17, 2012 (JP) ................................ 2012-032403

(51) Int. Cl.
| | |
|---|---|
| *G02B 25/00* | (2006.01) |
| *G02B 13/22* | (2006.01) |
| *G03B 13/06* | (2006.01) |
| *G02B 27/01* | (2006.01) |
| *G02B 13/18* | (2006.01) |

(52) U.S. Cl.
CPC .............. *G02B 25/001* (2013.01); *G02B 13/22* (2013.01); *G03B 13/06* (2013.01); *G02B 13/18* (2013.01); *G02B 2027/0118* (2013.01); *Y10T 29/49826* (2015.01)

(58) Field of Classification Search
CPC ....... G02B 25/001; G02B 13/22; G02B 13/18
USPC .......................................... 359/645, 716, 785
See application file for complete search history.

(56) References Cited

U.S. PATENT DOCUMENTS

| | | | |
|---|---|---|---|
| 8,531,774 B2 * | 9/2013 | Kubota | ......................... 359/645 |
| 2004/0021776 A1 | 2/2004 | Tochigi et al. | |
| 2010/0290129 A1 | 11/2010 | Nishio et al. | |

FOREIGN PATENT DOCUMENTS

| | | |
|---|---|---|
| JP | 07-281256 A | 10/1995 |
| JP | 09-243936 A | 9/1997 |
| JP | 2004-048371 A | 2/2004 |
| JP | 2008-052085 A | 3/2008 |
| JP | 2010-266776 A | 11/2010 |

* cited by examiner

*Primary Examiner* — Zachary Wilkes
(74) *Attorney, Agent, or Firm* — Miles & Stockbridge P.C.

(57) ABSTRACT

An ocular optical system EL for observing an image displayed on an image display element Ob has, in order from the image display element Ob: a first lens L1 which is a positive lens; a second lens L2 which is a negative lens having a strong concave surface facing the image display element Ob; and a third lens L3 which is a positive lens having a strong convex surface facing the eye point EP in order to implement both high magnification and size reduction, wherein the first lens L1 is cemented and integrated with the image display element Ob, in order to reduce the size of the ocular optical system EL while ensuring tele-centricity and sufficiently wide luminous flux.

33 Claims, 11 Drawing Sheets

OCULAR OPTICAL SYSTEM AND OPTICAL APPARATUS

RELATED APPLICATION

This invention claims the benefit of Japanese Patent Applications Nos. 2011-043729, 2011-043734 and 2012-032403 which are hereby incorporated by reference.

TECHNICAL FIELD

The present invention relates to an ocular optical system for observing an image displayed on an image display element, and an optical apparatus having the same.

TECHNICAL BACKGROUND

An electronic view finder, which allows observing an image displayed on a compact image display element at high magnification using an ocular optical system, has been proposed (e.g. see Japanese Patent Application Laid-Open No. 2004-48371(A)).

However for the ocular optical system used for such a view finder, it is demanded to implement compactness of the optical system and good optical performance while guaranteeing high magnification.

SUMMARY OF THE INVENTION

With the foregoing in view, it is an object of the present invention to provide an ocular optical system which is compact and has good optical performance while guaranteeing high magnification, and an optical apparatus adopting this ocular optical system.

To achieve this object, a first ocular optical system according to the present invention is an ocular optical system for observing an image displayed on an image display element comprising, in order from the image display element: a first lens which is a positive lens; a second lens which is a negative lens; and a third lens which is a positive lens, wherein the following conditional expressions are satisfied:

$$2.50 < f1/fe < 8.00 \text{ and}$$

$$0.41 < d12/fe < 0.80,$$

where f1 denotes a focal length of the first lens, fe denotes a focal length of the ocular optical system, and d12 denotes a distance between the first lens and the second lens.

In the first ocular optical system having the above configuration, it is preferable that the following conditional expression is satisfied:

$$0.00 \le d0/d12 < 0.50,$$

where d0 denotes a distance between the image display element and the first lens.

In the first ocular optical system having the above configuration, it is preferable that the image display element and the first lens are cemented.

In the first ocular optical system having the above configuration, it is preferable that the following conditional expression is satisfied:

$$5.00 < f1/f3 < 13.00,$$

where f3 denotes a focal length of the third lens.

In the first ocular optical system having the above configuration, it is preferable that the following expression is satisfied:

$$4.00 < (-1) \times (f1/f2) < 12.00,$$

where f2 denotes a focal length of the second lens.

In the first ocular optical system having the above configuration, it is preferable that the following conditional expression is satisfied:

$$0.00 \le d0/TL < 0.10,$$

where d0 denotes a distance between the image display element and the first lens, and TL denotes a distance from the image display element to the lens surface closest to the eye point.

In the first ocular optical system having the above configuration, it is preferable that the following conditional expression is satisfied:

$$0.30 < d12/TL < 0.70,$$

where TL denotes a distance from the image display element to the eye point.

In the first ocular optical system having the above configuration, it is preferable that at least one of the second lens and the third lens has an aspherical surface.

In the first ocular optical system having the above configuration, it is preferable that at least one of the second lens and the third lens is a plastic lens.

In the first ocular optical system having the above configuration, it is preferable that the diopter is corrected by changing the distance between the first lens and the second lens.

A first optical apparatus according to the present invention comprises: an objective lens; an imaging element which captures an image formed by the objective lens; an image display element which displays the image captured by the imaging element; and an ocular optical system for observing the image displayed on the image display element, wherein the ocular optical system is the first ocular optical system mentioned above.

A second ocular optical system according to the present invention is an ocular optical system for observing an image displayed on an image display element comprising, in order from the image display element: a first lens which is a positive lens; a second lens which is a negative lens; a third lens which is a positive lens, wherein the following conditional expressions is satisfied:

$$0.00 \le d0/TL < 0.10 \text{ and}$$

$$0.30 < d12/TL < 0.70$$

where d0 denotes a distance between the image display element and the first lens, d12 denotes a distance between the first lens and the second lens, and TL denotes a distance from the image display element to the lens surface closest to the eye point.

In the second ocular optical system having the above configuration, it is preferable that the following conditional expression is satisfied:

$$2.50 < f1/fe < 8.00,$$

where f1 denotes a focal length of the first lens, and fe denotes a focal length of the ocular optical system.

In the second ocular optical system having the above configuration, it is preferable that the following conditional expression is satisfied:

$$0.00 \le d0/d12 < 0.50$$

In the second ocular optical system having the above configuration, it is preferable that the image display element and the first lens are cemented.

In the second ocular optical system having the above configuration, it is preferable that the following conditional expression is satisfied:

$$5.00 < f1/f3 < 13.00,$$

where f1 denotes a focal length of the first lens, and f3 denotes a focal length of the third lens.

In the second ocular optical system having the above configuration, it is preferable that the following conditional expression is satisfied:

$$4.00 < (-1) \times (f1/f2) < 12.00,$$

where f1 denotes a focal length of the first lens, and f2 denotes a focal length of the second lens.

In the second ocular optical system having the above configuration, it is preferable that at least one of the second lens and the third lens has an aspherical surface.

In the second ocular optical system having the above configuration, it is preferable that at least one of the second lens and the third lens is a plastic lens.

In the second ocular optical system having the above configuration, it is preferable that the diopter is corrected by changing the distance between the first lens and the second lens.

A second optical apparatus according to the present invention comprises: an objective lens; an imaging element which captures an image formed by the objective lens; an image display element which displays the image captured by the imaging element; and an ocular optical system for observing the image displayed on the image display element, wherein the ocular optical system is the second ocular optical system mentioned above.

A method for manufacturing a first ocular optical system according to the present invention is a method for manufacturing an ocular optical system for observing an image displayed on an image display element, comprising a step of positioning, in order from the image display element, a first lens which is a positive lens, a second lens which is a negative lens, and a third lens which is a positive lens, so as to satisfy the following conditional expressions:

$$2.50 < f1/fe < 8.00 \text{ and}$$

$$0.41 < d12/fe < 0.80,$$

where f1 denotes a focal length of the first lens, fe denotes a focal length of the ocular optical system, and d12 denotes a distance between the first lens and the second lens.

In the method for manufacturing the first ocular optical system, it is preferable that the following conditional expression is satisfied:

$$0.00 \le d0/d12 < 0.50,$$

where d0 denotes a distance between the image display element and the first lens.

In the method for manufacturing the first ocular optical system, it is preferable that the image display element and the first lens are cemented.

In the method for manufacturing the first ocular optical system, it is preferable that the following conditional expression is satisfied:

$$5.00 < f1/f3 < 13.00,$$

where f3 denotes a focal length of the third lens.

In the method for manufacturing the first ocular optical system, it is preferable that the following conditional expression is satisfied:

$$4.00 < (-1) \times (f1/f2) < 12.00,$$

where f2 denotes a focal length of the second lens.

In the method for manufacturing the first ocular optical system, it is preferable that the following conditional expression is satisfied:

$$0.00 \le d0/TL < 0.10,$$

where d0 denotes a distance between the image display element and the first lens, and TL denotes a distance from the image display element to the lens surface closest to the eye point.

A method for manufacturing a second ocular optical system according to the present invention is a method for manufacturing an ocular optical system for observing an image displayed on an image display element, comprising a step of positioning, in order from the image display element, a first lens which is a positive lens, a second lens which is a negative lens, and a third lens which is a positive lens, so as to satisfy the following conditional expressions:

$$0.00 \le d0/TL < 0.10 \text{ and}$$

$$0.30 < d12/TL < 0.70,$$

where d0 denotes a distance between the image display element and the first lens, d12 denotes a distance between the first lens and the second lens, and TL denotes a distance from the image display element to the lens surface closest to the eye point.

In the method for manufacturing the second ocular optical system, it is preferable that the following conditional expression is satisfied:

$$2.50 < f1/fe < 8.00,$$

where f1 denotes a focal length of the first lens, and fe denotes a focal length of the ocular optical system.

In the method for manufacturing the second ocular optical system, it is preferable that the following conditional expression is satisfied:

$$0.00 \le d0/d12 < 0.50$$

In the method for manufacturing the second ocular optical system, it is preferable that the image display element and the first lens are cemented.

In the method for manufacturing the second ocular optical system, it is preferable that the following conditional expression is satisfied:

$$5.00 < f1/f3 < 13.00,$$

where f1 denotes a focal length of the first lens, and f3 denotes a focal length of the third lens.

In the method for manufacturing the second ocular optical system, it is preferable that the following conditional expression is satisfied:

$$4.00 < (-1) \times (f1/f2) < 12.00,$$

where f1 denotes a focal length of the first lens, and f2 denotes a focal length of the second lens.

According to the present invention, compactness and good optical performance can be implemented while guaranteeing high magnification.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE EMBODIMENTS

Preferred embodiments of the present invention will now be described with reference to the drawings.

First Embodiment

Figure 9:
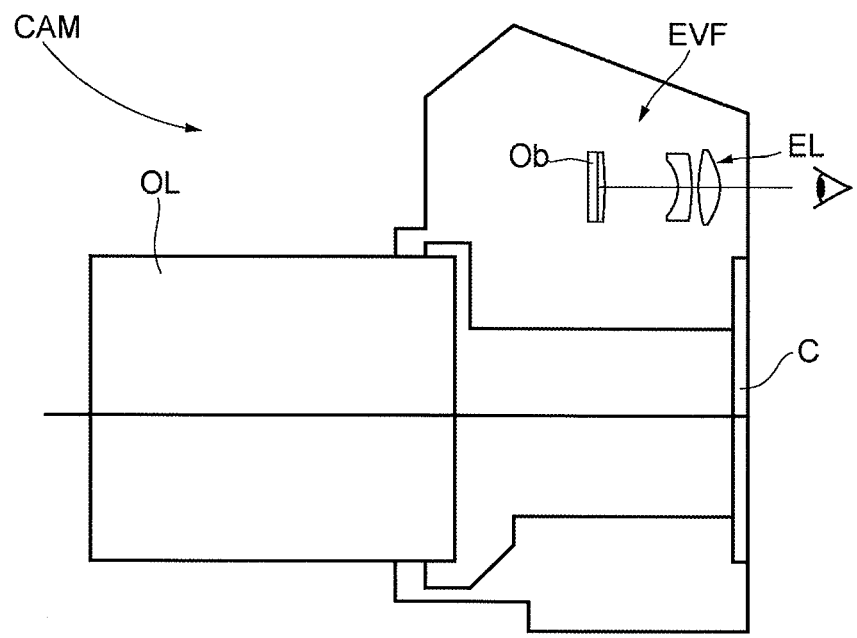
FIG. 9 is a cross-sectional view of a digital single-lens reflex camera.

FIG. 9 shows a digital single-lens reflex camera CAM adopting an ocular optical system EL1 according to a first embodiment. This digital single-lens reflex camera CAM has an objective lens OL, an imaging element C such as CCD and CMOS, and an electronic view finder EVF. The electronic view finder EVF is constituted by an image display element Ob, such as a liquid crystal display element, and an ocular optical system EL1 for observing an image displayed on the image display element Ob.

In the digital single-lens reflex camera CAM having this configuration, lights from an object (not illustrated) are collected by the objective lens OL and form an image on the imaging element C. The object image formed on the imaging element C is captured by the imaging element C, and the object image captured by the imaging element C is displayed on the image display element Ob. Thereby the user can observe, via the ocular optical system EL1, the object image formed by the objective lens OL.

If a release button (not illustrated) is pressed by the user, an image captured by the imaging element C (that is, an image that corresponds to an image displayed on the image display element Ob and observed via the ocular optical system EL1) is recorded in a memory (not illustrated) as an object image. Thus the user can capture the image of the object using the digital single-lens reflex camera CAM.

Figure 1:
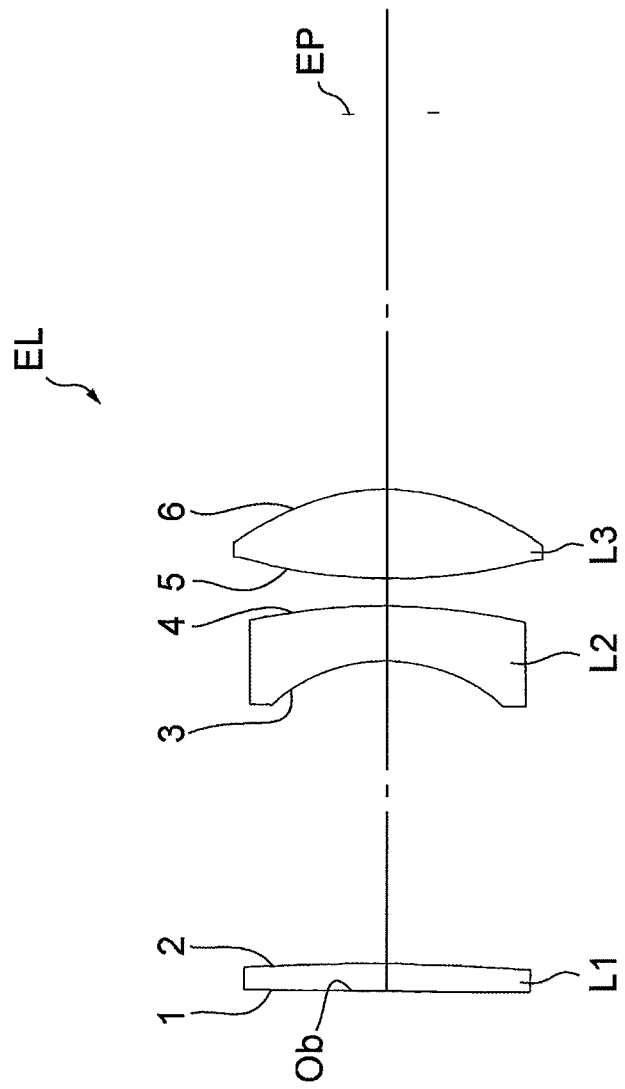
FIG. 1 is a cross-sectional view of an ocular optical system according to First Example.

As depicted in FIG. 1, an ocular optical system EL1 according to the first embodiment has, in order from the image display element Ob, a first lens L1 which is a positive lens, a second lens L2 which is a negative lens, and a third lens L3 which is a positive lens, and the first lens L1 is disposed near the image display element Ob. An object of the present embodiment is to implement an eye piece of which aberrations are corrected well, while guaranteeing compactness of the ocular optical system and a 25° or higher apparent angle of view. It is particularly targeted to implement both a decrease in overall length and outside dimensions of the lenses and guaranteeing tele-centricity.

For observing a display element, such as liquid crystals, it is important to guarantee tele-centricity in order to observe lights that are irradiated vertically from the display surface. However guaranteeing tele-centricity requires disposing a lens system larger than the image display element, and is inappropriate for implementing compactness. Furthermore in the case of implementing a high magnification ocular optical system of which apparent angle of view is 20° or higher and of which diagonal length is about 15 mm, strong refractive power is required, and generation of positive distortion tends to cause pin-cushion distortion on the observation field of view, which crates unnaturalness.

In order to decrease these aberrations, according to the ocular optical system EL1 of the present embodiment, a positive lens (first lens L1) is disposed near the image display element Ob (or so that this positive lens is integrated with the image display element Ob) for guaranteeing the tele-centricity while keeping external dimensions small. Furthermore a negative lens (second lens L2) is disposed for correcting coma aberration and distortion, and a positive lens (third lens L3) is disposed for correcting coma Aberration, distortion and curvature of field. Then the above mentioned problem is solved by defining the conditional expressions to be described herein below.

In the ocular optical system EL1 having this configuration, it is preferable that the following conditional expression (1) is satisfied, where f1 denotes a focal length of the first lens L1, and fe denotes a focal length of the ocular optical system EL1.

$$2.50 < f1/fe < 8.00 \qquad (1)$$

The conditional expression (1) is for specifying the focal length of the first lens L1 with respect to the focal length of the entire ocular optical system EL1 for guaranteeing tele-centricity and correcting distortion. If tele-centricity is not maintained, the image around the image display element Ob becomes deteriorated due to chromatic aberration and insufficient light quantity. If the positive lens (first lens L1) is disposed near the image display element Ob, pin-cushion distortion can be corrected well. If the lower limit value of the conditional expression (1) is not reached, distortion is over-corrected, and barrel distortion occurs. Furthermore it becomes difficult to correct coma aberration since light enters the second lens L2 at a large incident angle. If the upper limit value of the conditional expression (1) is exceeded, correction of distortion becomes insufficient and pin-cushion distortion remains. Furthermore the lens diameter must be increased to guarantee tele-centricity.

If the upper limit value of the conditional expression (1) is set to 7.00, the effect of this embodiment is demonstrated well. If the lower limit value of the conditional expression (1) is set to 3.00, the effect of this embodiment is demonstrated even more so.

In the ocular optical system EL1, it is preferable that the following conditional expression (2) is satisfied, where d12 denotes a distance between the first lens L1 and the second lens L2.

$$0.41 < d12/fe < 0.80 \quad (2)$$

The conditional expression (2) is for specifying the distance between the first lens L1 and the second lens L2 with respect to the focal length of the entire ocular optical system EL1. If the lower limit value of the conditional expression (2) is not reached, the distance between the first lens L1 and the second lens L2 becomes narrow, and the size of the second lens L2 becomes large. Furthermore the position of the ray upon entering the second lens L2 becomes high, and coma aberration is generated. If the upper limit value of the conditional expression (2) is exceeded, on the other hand, the distance between the first lens L1 and the second lens L2 becomes wide, therefore the refractive power of the second lens L2 required for implementing sufficient magnification becomes too strong, and curvature of field is generated.

If the lower limit value of the conditional expression (2) is set to 0.45, the effect of this embodiment is demonstrated well. Further the lower limit is more preferably set to 0.52 to make the effect of this embodiment better. If the upper limit value of the conditional expression (2) is set to 0.63, the effect of the embodiment is demonstrated even more so.

In the ocular optical system EL1, it is preferable that the following conditional expression (3) is satisfied, where d0 denotes a distance between the image display element Ob and the first lens L1.

$$0.00 \le d0/d12 < 0.50 \quad (3)$$

The conditional expression (3) is for specifying a position of the first lens L1 between the image display element Ob and the second lens L2. If the upper limit value of the conditional expression (3) is exceeded, correction of distortion becomes insufficient, and pin-cushion distortion remains. The lower limit value of the conditional expression (3), on the other hand, is a conditional value when the image display element Ob and the first lens L1 are adjacent to each other.

If the upper limit value of the conditional expression (3) is set to 0.10, the effect of this embodiment is demonstrated well.

In the ocular optical system ELL it is preferable that the image display element Ob and the first lens L1 are cemented, and d0=0.00. By integrating the positive lens (first lens L1) with the image display element Ob, the distortion can be corrected, and by deflecting the luminous flux emitted vertically from the image display element Ob in the optical axis direction, the optical system after the second lens L2 can be smaller.

In the ocular optical system EL1, it is preferable that the following conditional expression (4) is satisfied, where f3 is a focal length of the third lens L3.

$$5.00 < f1/f3 < 13.00 \quad (4)$$

The conditional expression (4) is for specifying the focal length between the first lens L1 and the third lens L3 for correcting the distortion. If the lower limit value of the conditional expression (4) is not reached, the power of the third lens L3 becomes weak, and sufficient finder magnification cannot be implemented. If the focal length of the first lens L1 is short, coma aberration is also generated. If the upper limit value of the conditional expression (4) is exceeded, on the other hand, negative distribution remains, and the field of view is distorted to be a barrel shape. Correction of spherical aberration also becomes difficult.

If the lower limit value of the conditional expression (4) is set to 7.00, the effect of this embodiment is demonstrated well. If the upper limit value of the conditional expression (4) is set to 12.00, the effect of this embodiment is demonstrated even more so.

In the ocular optical system EL1, it is preferable that the following conditional expression (5) is satisfied, where f2 denotes a focal length of the second lens L2.

$$4.00 < (-1) \times (f1/f2) < 12.00 \quad (5)$$

The conditional expression (5) is for specifying the focal lengths of the first lens L1 and the second lens L2 to correct distortion and coma aberration well. If the lower limit value of the conditional expression (5) is not reached, the focal length of the second lens L2 becomes long. Therefore if the position of the third lens L3 remains the same, the height of the ray upon entering the third lens L3 becomes low and the eye point is short, which makes this system difficult to use. In order to make the eye point longer, the third lens L3 must be shifted to the rear, and the size of the entire optical system becomes large. Correction of distortion also becomes insufficient. If the upper limit value of the conditional expression (5) is exceeded, the size of the second lens L2 becomes large. Incident angle of the ray to the third lens L3 increases, and curvature of field and spherical aberration are generated, of which correction becomes difficult.

If the lower limit value of the conditional expression (5) is set to 5.00, the effect of this embodiment is demonstrated well. If the upper limit value of the conditional expression (5) is set to 10.00, the effect of this embodiment is demonstrated even more so.

Figure 10:
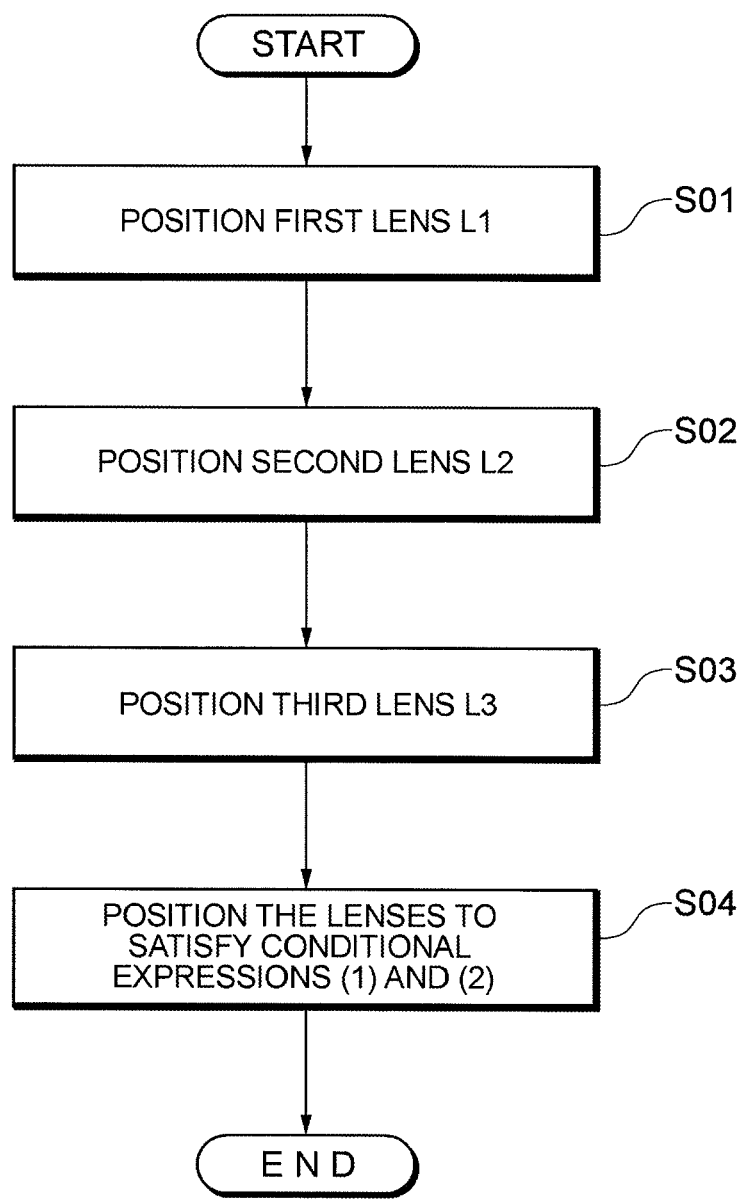
FIG. 10 is a flow chart to show the manufacturing method of the ocular optical system EL1 according to the first embodiment.

Now a method for manufacturing the ocular optical system EL1 according to the above mentioned first embodiment will be described with reference to FIG. 10. According to this manufacturing method, a first lens L1, a second lens L2 and a third lens L3 are positioned in order from the image display element, and then these lenses are positioned so as to satisfy the following conditional expressions (1) and (2):

$$2.50 < f1/fe < 8.00 \quad (1)$$

$$0.41 < d12/fe < 0.80 \quad (2)$$

where f1 denotes a focal length of the first lens, fe denotes a focal length of the ocular optical system, and d12 denotes a distance between the first lens and the second lens.

In concrete terms, in a cylindrical lens barrel, the first lens which is a positive lens is positioned (step S01), then the second lens which is a negative lens is positioned (step S02), and the third lens which is a negative lens is positioned (step S03), in order from the image display element. Then these lenses are positioned so as to satisfy the conditional expressions (1) and (2) (step S04).

Second Embodiment

Now an ocular optical system EL2 according to the second embodiment will be described. The digital single-lens reflex camera CAM having the ocular optical system EL2 according to the second embodiment is the same as the camera depicted in FIG. 9, described in the first embodiment. Therefore the description thereof is omitted.

As depicted in FIG. 1, an ocular optical system EL2 according to the second embodiment has, in order from the image display element Ob, a first lens L1 which is a positive lens, a second lens L2 which is a negative lens, and a third lens L3 which is a positive lens, and the first lens L1 is disposed near the image display element Ob. An object of the present embodiment is to implement an eye piece of which aberrations are corrected well, while guaranteeing compactness of the ocular optical system and a 25° or higher apparent angle of view. It is particularly targeted to implement both a decrease in overall length and outside dimensions of the lenses and guaranteeing tele-centricity.

According to the ocular optical system EL2 of the second embodiment, a positive lens (first lens L1) is disposed near the image display element Ob (or so that this positive lens is integrated with the image display element Ob) for guaranteeing the tele-centricity while keeping external dimensions small. Furthermore a negative lens (second lens L2) is disposed for correcting coma aberration and distortion, and a positive lens (third lens L3) is disposed for correcting coma aberration, distortion and curvature of field. Then the above mentioned problem is solved by defining the conditional expressions to be described herein below.

In the ocular optical system EL2 having this configuration, it is preferable that the following conditional expression (6) is satisfied, where d0 denotes a distance between the image display element Ob and the first lens L1, and TL denotes a distance from the image display element Ob to the lens surface closest to the eye point EP.

$$0.00 \leq d0/TL < 0.10 \quad (6)$$

The conditional expression (6) is for specifying the distance from the image display element Ob to the first lens L1 with respect to the overall length of the system. If the upper limit value of the conditional expression (6) is exceeded, correction of distortion becomes insufficient, and pin-cushion distortion remains. The lower limit value of the conditional expression (6), on the other hand, is a conditional value when the image display element Ob and the first lens L1 are adjacent to each other.

If the upper limit value of the conditional expression (6) is set to 0.05, the effect of this embodiment is demonstrated well.

In the ocular optical system EL2, it is preferable that the following conditional expression (7) is satisfied, where d12 denotes a distance between the first lens L1 and the second lens L2.

$$0.30 < d12/TL < 0.70 \quad (7)$$

The conditional expression (7) is for specifying the distance between the first lens L1 and the second lens L2 with respect to the overall length of the system. If the lower limit value of the conditional expression (7) is not reached, the distance between the first lens L1 and the second lens L2 becomes narrow, and the size of the second lens L2 becomes large. Furthermore the position of the ray upon entering the second lens L2 becomes high, and coma aberration is generated. If the upper limit value of the conditional expression (7) is exceeded, on the other hand, the distance between the first lens L1 and the second lens L2 becomes wide, therefore the refractive power of the second lens L2 required for implementing sufficient magnification becomes too strong, and curvature of field is generated.

If the lower limit value of the conditional expression (7) is set to 0.40, the effect of this embodiment is demonstrated well. If the upper limit value of the conditional expression (7) is 0.65, the effect of this embodiment is demonstrated even more so.

Moreover, in the ocular optical system EL2 having this configuration, it is preferable that the following conditional expression (8) is satisfied, where f1 denotes a focal length of the first lens L1, and fe denotes a focal length of the ocular optical system EL2.

$$2.50 < f1/fe < 8.00 \quad (8)$$

The conditional expression (8) is for specifying the focal length of the first lens L1 with respect to the focal length of the entire ocular optical system EL2 for guaranteeing tele-centricity and correcting distortion. If tele-centricity is not maintained, the image around the image display element Ob becomes deteriorated due to chromatic aberration and insufficient light quantity. If the positive lens (first lens L1) is disposed near the image display element Ob, pin-cushion distortion can be corrected well. If the lower limit value of the conditional expression (8) is not reached, distortion is over-corrected, and barrel distortion occurs. Furthermore it becomes difficult to correct coma aberration since light enters the second lens L2 at a large incident angle. If the upper limit value of the conditional expression (8) is exceeded, correction of distortion becomes insufficient and pin-cushion distortion remains. Furthermore the lens diameter must be increased to guarantee tele-centricity.

If the upper limit value of the conditional expression (8) is set to 7.00, the effect of this embodiment is demonstrated well. If the lower limit value of the conditional expression (8) is set to 3.00, the effect of this embodiment is demonstrated even more so.

In the ocular optical system EL2, it is preferable that the following conditional expression (9) is satisfied.

$$0.00 \leq d0/d12 < 0.50 \quad (9)$$

The conditional expression (9) is for specifying a position of the first lens L1 between the image display element Ob and the second lens L2. If the upper limit value of the conditional expression (9) is exceeded, correction of distortion becomes insufficient, and pin-cushion distortion remains. The lower limit value of the conditional expression (9), on the other hand, is a conditional value when the image display element Ob and the first lens L1 are adjacent to each other.

If the upper limit value of the conditional expression (9) is set to 0.10, the effect of this embodiment is demonstrated well.

In the ocular optical system EL2, it is preferable that the image display element Ob and the first lens L1 are cemented, and d0=0.00. By integrating the positive lens (first lens L1) with the image display element Ob, the distortion can be corrected, and by deflecting the luminous flux emitted vertically from the image display element Ob in the optical axis direction, the optical system after the second lens L2 can be smaller.

In the ocular optical system EL2, it is preferable that the following conditional expression (10) is satisfied, where f1 is a focal length of the first lens L1 and f3 is a focal length of the third lens L3.

$$5.00 < f1/f3 < 13.00 \quad (10)$$

The conditional expression (10) is for specifying the focal length between the first lens L1 and the third lens L3 for correcting the distortion. If the lower limit value of the conditional expression (10) is not reached, the power of the third lens L3 becomes weak, and sufficient finder magnification cannot be implemented. If the focal length of the first lens L1 is short, coma aberration is also generated. If the upper limit value of the conditional expression (10) is exceeded, on the other hand, negative distribution remains, and the field of view is distorted to be a barrel shape. Correction of spherical aberration also becomes difficult.

If the lower limit value of the conditional expression (10) is set to 7.00, the effect of this embodiment is demonstrated well. If the upper limit value of the conditional expression (10) is set to 12.00, the effect of this embodiment is demonstrated even more so.

In the ocular optical system EL2, it is preferable that the following conditional expression (11) is satisfied, where f2 denotes a focal length of the second lens L2.

$$4.00 < (-1) \times (f1/f2) < 12.00 \quad (11)$$

The conditional expression (11) is for specifying the focal lengths of the first lens L1 and the second lens L2 to correct distortion and coma aberration well. If the lower limit value of the conditional expression (11) is not reached, the focal length of the second lens L2 becomes long. Therefore if the position of the third lens L3 remains the same, the height of the ray upon entering the third lens L3 becomes low and the eye point is short, which makes this system difficult to use. In order to make the eye point longer, the third lens L3 must be shifted to the rear, and the size of the entire optical system becomes large. Correction of distortion also becomes insufficient. If the upper limit value of the conditional expression (11) is exceeded, the size of the second lens L2 becomes large. Incident angle of the ray to the third lens L3 increases, and curvature of field and spherical aberration are generated, of which correction becomes difficult.

If the lower limit value of the conditional expression (11) is set to 5.00, the effect of this embodiment is demonstrated well. If the upper limit value of the conditional expression (11) is set to 10.00, the effect of this embodiment is demonstrated even more so.

In the ocular optical system EL2 according to the first and second embodiments described above, it is preferable that at least one of the second lens L2 and the third lens L3 has an aspherical surface. If the second lens L2 in particular has an aspherical surface, coma aberration, astigmatism and distortion can be improved. If the third lens L3 has an aspherical surface, distortion, coma aberration and spherical aberration can be improved.

In the ocular optical system EL2 according to the first and second embodiments, it is preferable that at least one of the second lens L2 and the third lens L3 is a plastic lens. If the second lens L2 or the third lens L3 is a plastic lens, an aspherical surface can be easily created, which is advantageous for correcting aberrations. Even if all the lenses are plastic lenses, sufficient correction capability can be demonstrated.

In the ocular optical system EL2 according to the first and second embodiments, it is preferable that the diopter is corrected by changing the distance between the first lens L1 and the second lens L2. By changing the distance between the first lens L1 and the second lens L2 along the optical axis, the diopter can be corrected without dropping the optical performance.

According to the first and second embodiments, an ocular optical system EL2, which is compact and has good optical performance while guaranteeing high magnification, and an optical apparatus (digital single-lens reflex camera CAM) adopting the ocular optical system EL2, can be implemented.

Figure 11:
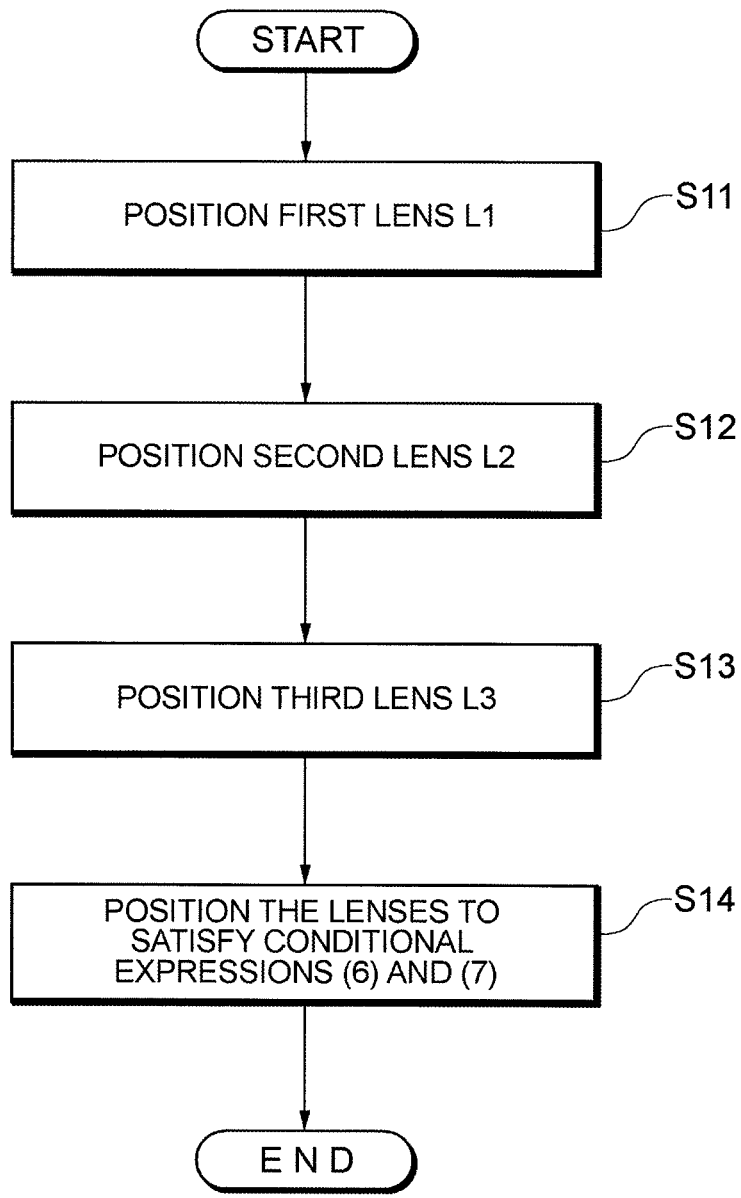
FIG. 11 is a flow chart to show the manufacturing method of the ocular optical system EL2 according to the second embodiment.

Now a method for manufacturing the ocular optical system EL2 according to the above mentioned second embodiment will be described with reference to FIG. 11. According to this manufacturing method, a first lens L1, a second lens L2 and a third lens L3 are positioned in order from the image display element, and then these lenses are positioned so as to satisfy the following expressions (6) and (7):

$$0.00 \le d0/TL < 0.10 \quad (6)$$

$$0.30 < d12/TL < 0.70 \quad (7)$$

where d0 denotes a distance between the image display element and the first lens, d12 denotes a distance between the first lens and the second lens, and TL denotes a distance from the image display element to the lens surface closest to the eye point.

In concrete terms, in the cylindrical lens barrel, the first lens which is a positive lens is positioned (step S11), then the second lens which is a negative lens is positioned (step S12), and the third lens which is a positive lens is positioned (step S13), in order from the image display element. Then these lenses are positioned so as to satisfy the conditional expressions (6) and (7) (step S14).

EXAMPLES

Concrete examples of the ocular optical system EL according to the above mentioned first and second embodiments will be described with reference to the drawings.

First Example

First Example will be described with reference to FIG. 1, FIG. 2 and Table 1. FIG. 1 is a cross-sectional view of an ocular optical system EL according to First Example, when the diopter is −1 [m$^{-1}$]. The ocular optical system EL according to First Example comprises, in order from an image display element Ob: a first lens L1 which is a positive lens; a second lens L2 which is a negative lens; and a third lens L3 which is a positive lens, and the first lens L1 is disposed adjacent to the image display element Ob.

The first lens L1 is a positive lens which is cemented and integrated with the image display element Ob by a frame member (not illustrated), in order to make the ocular optical system EL compact, while guaranteeing tele-centricity and sufficiently wide luminous flux. The second lens L2 is a negative lens (meniscus lens) having a strong concave surface facing the image display element Ob, and the lens surface of the second lens L2 facing the image display element Ob is aspherical. The third lens L3 is a positive lens (convex lens) having a strong convex surface facing the eye point EP, in order to Implement both high magnification and compactness, and the lens surface of the third lens L3 facing the eye point EP is aspherical.

The first lens L1 is a glass lens, and the second lens L2 and the third lens L3 are plastic lenses. Upon correcting the diopter, the distance between the first lens L1 and the second lens L2 is changed by the image display element Ob and the first lens L1 being fixed, and the second lens L2 and the third lens L3 moving together along the optical axis.

Table 1 to Table 4 shown below list each data on the ocular optical system EL (when the diopter is −1[m$^{-1}$]) according to First Example to Fourth Example. In [General Data] in each table, f1 to f3 is each focal length of the first to third lenses L1 to L3, h is an object height, TL is a distance from the image display element Ob to the lens surface closest to the eye point EP, and fe is a focal length of the entire ocular optical system EL. In [Lens Data], a numeric value in the first column on the left side of the tables is the number of the optical surface (surface number) counted from the observation image (display element surface), and at the right of the first column, a radius of curvature of the lens surface, a distance to the next lens surface, an Abbe number at d-line (wavelength λ=587.6 nm), and a refractive index at d-line (wavelength λ=587.6 nm) are sequentially shown. "*" attached to the right of the surface number indicates that this lens surface is aspherical. The radius of curvature "0" indicates a plane, and the refractive index of air (nd=1.00000) is omitted.

In [Aspherical Data], an aspherical coefficient is given by the following expression (12), where the x axis is in the optical axis direction, the y axis is in a direction perpendicular to the optical axis, κ denotes a conical coefficient, An denotes an aspherical coefficient in degree n (n=4, 6, 8, 10), and r denotes a paraxial radius of curvature shown in [Lens Data]. In each example, the aspherical coefficient in degree 2, that is A2, is 0, which is omitted in the tables. In [Aspherical Data], "E–n" indicates "×10$^{-n}$".

$$x = (y^2/r)/[1 + \{1 - \kappa \times (y^2/r^2)\}^{1/2}] + \qquad (12)$$
$$A4 \times y^4 + A6 \times y^6 + A8 \times y^8 + A10 \times y^{10}$$

In all data values, "mm" is normally used as the unit of focal length, radius of curvature and other lengths, but unit is not limited to "mm", since an equivalent optical performance is obtained even if an optical system is proportionally expanded or proportionally reduced. For the data values of the later mentioned Second to Fourth Examples as well, symbols the same as in this example are used.

Table 1 shows each data of First Example. The surface numbers 1 to 6 in Table 1 correspond to surfaces 1 to 6 in FIG. 1. In First Example, the lens surfaces of surface 3 and surface 6 are formed to be aspherical respectively.

TABLE 1

[General Data]

f1 = 153.7755
f2 = −19.2339
f3 = 13.6538
h = 6.3
TL = 22.6
fe = 22.59

[Lens Data]

| surface number | radius of curvature | surface distance | Abbe number | refractive index |
|---|---|---|---|---|
| element surface | 0 | 0.00 | | |
| 1 | 0 | 1.21 | 35.31 | 1.59270 |
| 2 | −91.1429 | 13.64 | | |
| 3* | −8.3313 | 2.46 | 23.26 | 1.63980 |
| 4 | −28.7686 | 1.22 | | |
| 5 | 25.3244 | 4.06 | 55.91 | 1.53110 |
| 6* | −9.5966 | 17.00 | | |

[Aspherical Data]

surface 3

κ = −0.78767, A4 = −4.1624E−04, A6 = −7.6701E−06,
A8 = 4.9487E−08, A10 = 0.0000E+00
surface 6

κ = 1.13318, A4 = 2.1110E−04, A6 = −7.1482E−07,
A8 = 3.7871E−08, A10 = 0.00000E+00

Figure 2:
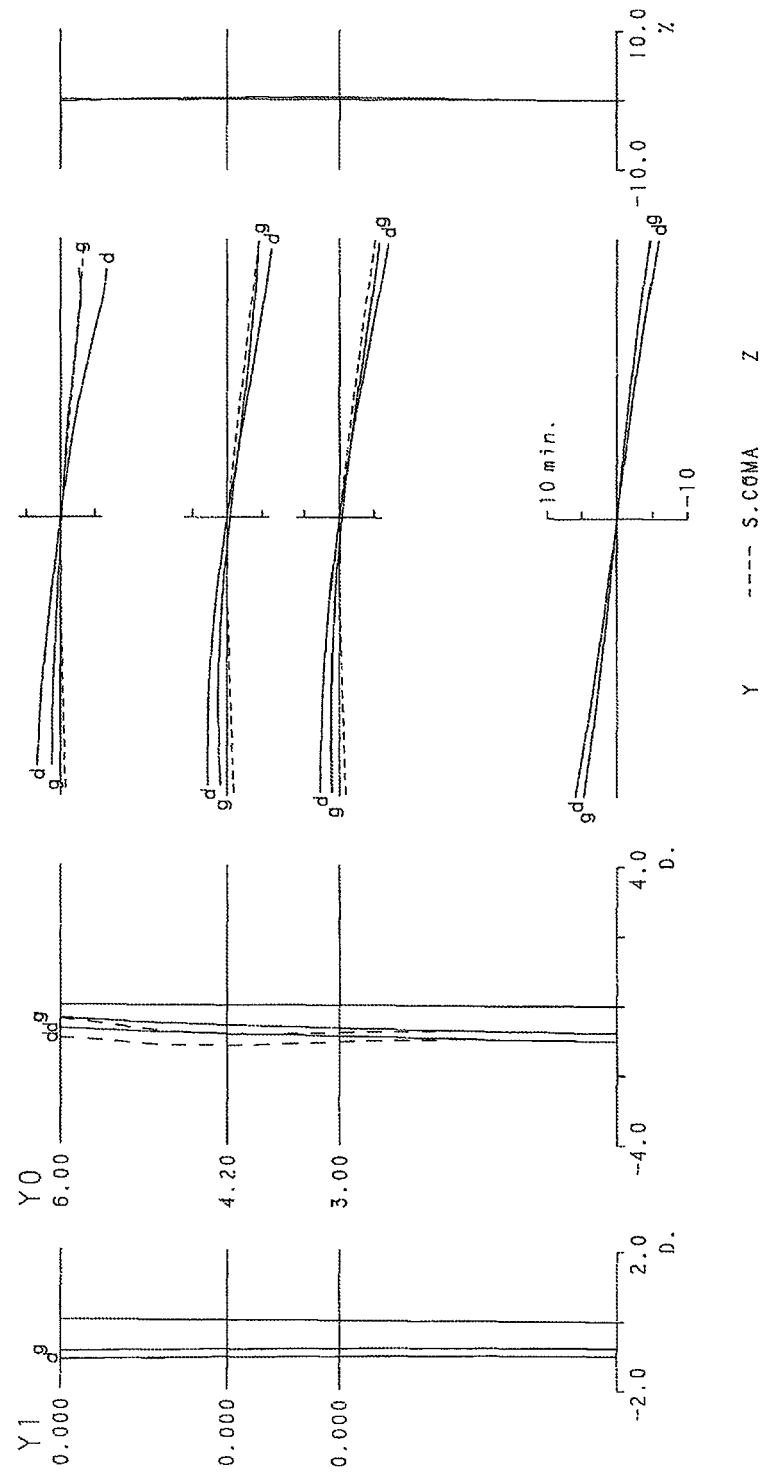
FIG. 2 are graphs showing various aberrations according to First Example when the diopter is −1 [m$^{-1}$]

FIG. 2 are graphs showing various aberrations of the ocular optical system EL according to First Example when the diopter is −1 [m$^{-1}$]. In FIG. 2 each graph shows, in order from the left, spherical aberration, astigmatism, coma aberration and distortion respectively. In each graph, Y1 indicates an incident height of the ray upon entering the erecting system, and Y0 indicates a height of the image display element. In each graph, "min" of the coma Aberration indicates the unit of an angle "minute", d indicates various aberrations at d-line (λ=587.6 nm), and g indicates various Aberrations at g-line (λ=435.8 nm). In each graph, the unit of spherical aberration and astigmatism is "m$^{-1}$", and is indicated as "D". [m$^{-1}$] is a diopter unit, and diopter X[m$^{-1}$] indicates a state where an image formed by the eye piece (ocular optical system) can be at a position 1/X [m (meter)] from the eye point on the optical axis. (The sign is positive when the image is formed on the observer side from the eye piece (ocular optical system).) The description on the graphs showing aberrations is the same for other examples.

As each graph showing aberrations clarifies, the ocular optical system according to First Example has an excellent image forming performance, where various aberrations are ideally corrected. As a result, an excellent optical performance can be guaranteed for a digital single-lens reflex camera CAM as well, by installing the ocular optical system EL of First Example.

Example 2

Figure 3:
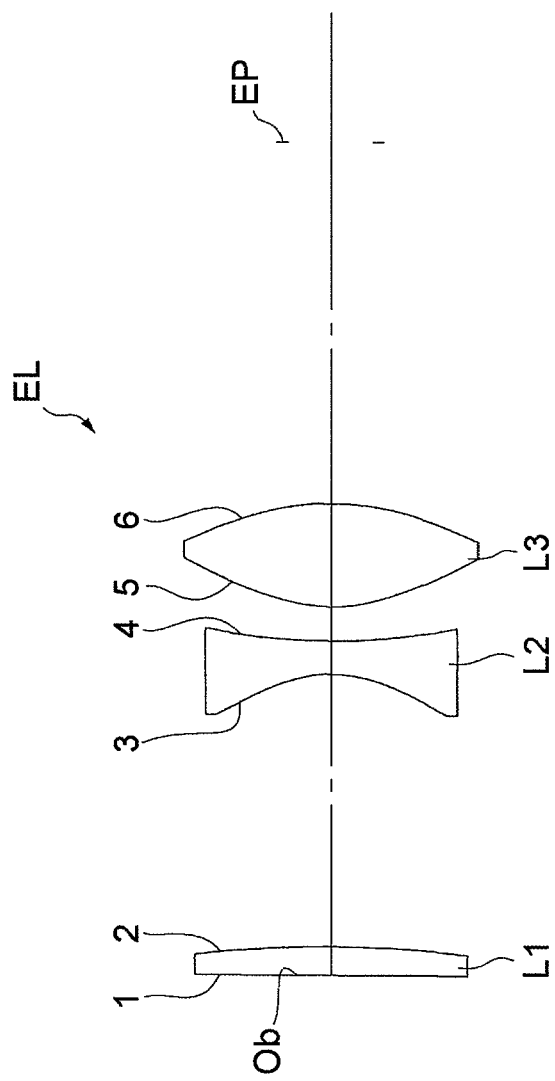
FIG. 3 is a cross-sectional view of an ocular optical system according to Second Example.

Second Example will now be described with reference to FIG. 3, FIG. 4 and Table 2. FIG. 3 is a cross-sectional view of an ocular optical system EL according to Second Example, when the diopter is −1 [m$^{-1}$]. The ocular optical system EL of Second Example has the same configuration as the ocular optical system EL of First Example, except for a part of the shapes of the second lens L2 and the third lens L3, therefore each component the same as First Example is denoted with a same reference symbol, for which detailed description is omitted. The second lens L2 of Second Example is a negative lens (concave lens) having a strong concave surface facing the image display element Ob, and the lens surface of the second lens L2 facing the image display element Ob is aspherical. The third lens L3 of Second Example is a positive lens (convex lens) having a strong convex surface facing the image display element Ob, in order to implement both high magnification and compactness, and both lens surfaces of the third lens L3 are aspherical.

Table 2 shows each data of Second Example. The surface numbers 1 to 6 in Table 2 correspond to surfaces 1 to 6 in FIG. 3. In Second Example, the lens surfaces of surface 3, surface 5 and surface 6 are formed to be aspherical respectively.

TABLE 2

[General Data]

f1 = 74.4508
f2 = −8.0912
f3 = 9.0291
h = 6.3
TL = 22.58
fe = 24.79

[Lens Data]

| surface number | radius of curvature | surface distance | Abbe number | refractive index |
|---|---|---|---|---|
| element surface | 0 | 0.00 | | |
| 1 | 0 | 1.37 | 29.51 | 1.71736 |
| 2 | −53.4081 | 12.97 | | |
| 3* | −5.7090 | 1.61 | 30.33 | 1.58276 |
| 4 | 29.9013 | 1.66 | | |
| 5* | 7.1199 | 4.97 | 55.91 | 1.54410 |
| 6* | −11.9469 | 17.00 | | |

TABLE 2-continued

[Aspherical Data]

surface 3

κ = 0.27017, A4 = 1.8938E−03, A6 = −6.1539E−05,
A8 = 1.0328E−06, A10 = 0.0000E+00
surface 5

κ = −2.20658, A4 = −3.4935E−04, A6 = 9.8856E−06,
A8 = −8.1919E−08, A10 = 0.00000E+00
surface 6

κ = −12.5206, A4 = 6.2189E−04, A6 = 1.0942E−05,
A8 = −6.6859E−08, A10 = 0.00000E+00

Figure 4:
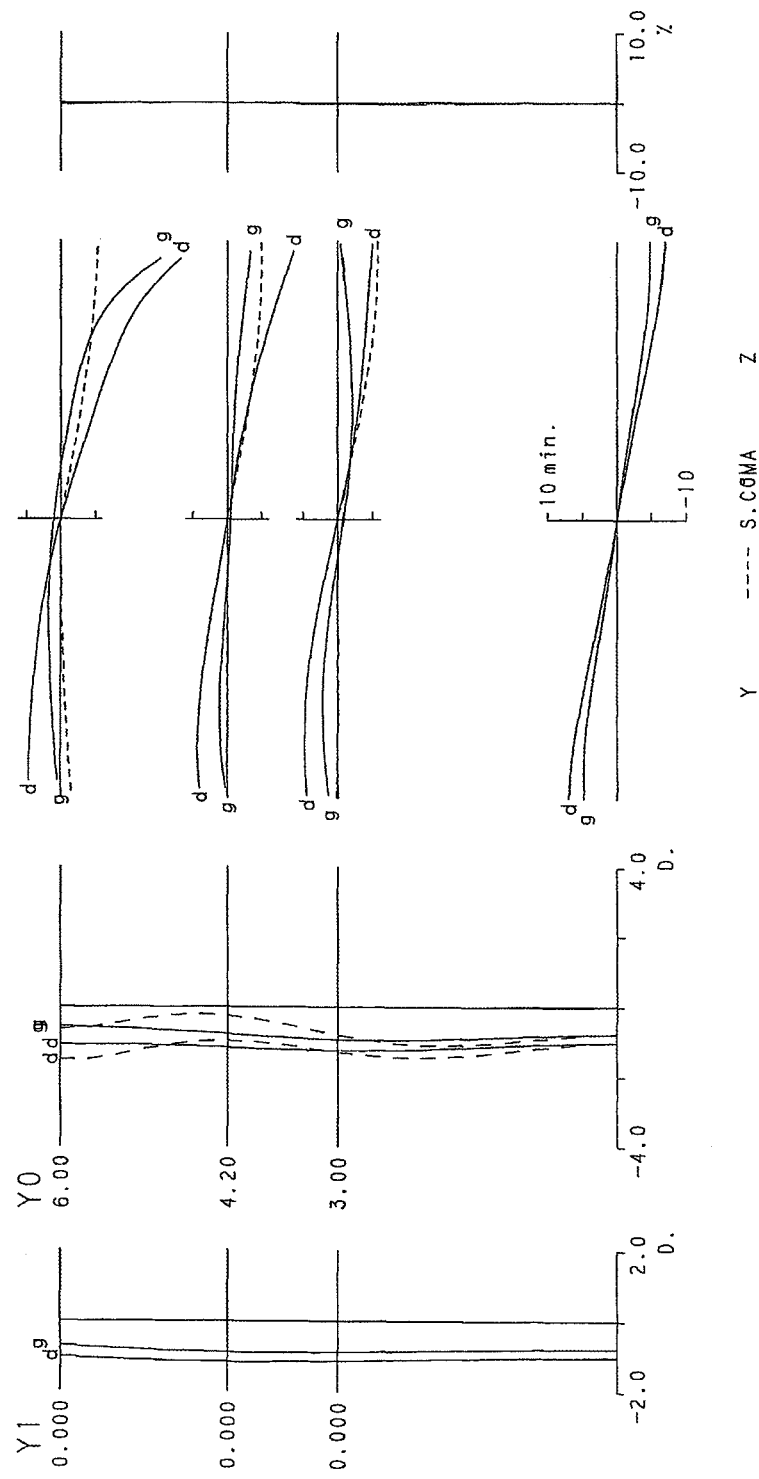
FIG. 4 are graphs showing various aberrations according to Second Example when the diopter is −1 [m$^{-1}$]

FIG. 4 are graphs showing various aberrations of the ocular optical system EL according to Second Example, when the diopter is −1 [m$^{-1}$]. As each graph showing aberrations clarifies, the ocular optical system according to Second Example has an excellent image forming performance, where various aberrations are ideally corrected. As a result, an excellent optical performance can be generated for the digital single-lens reflex camera CAM as well, by installing the ocular optical system EL of Second Example.

Example 3

Figure 5:
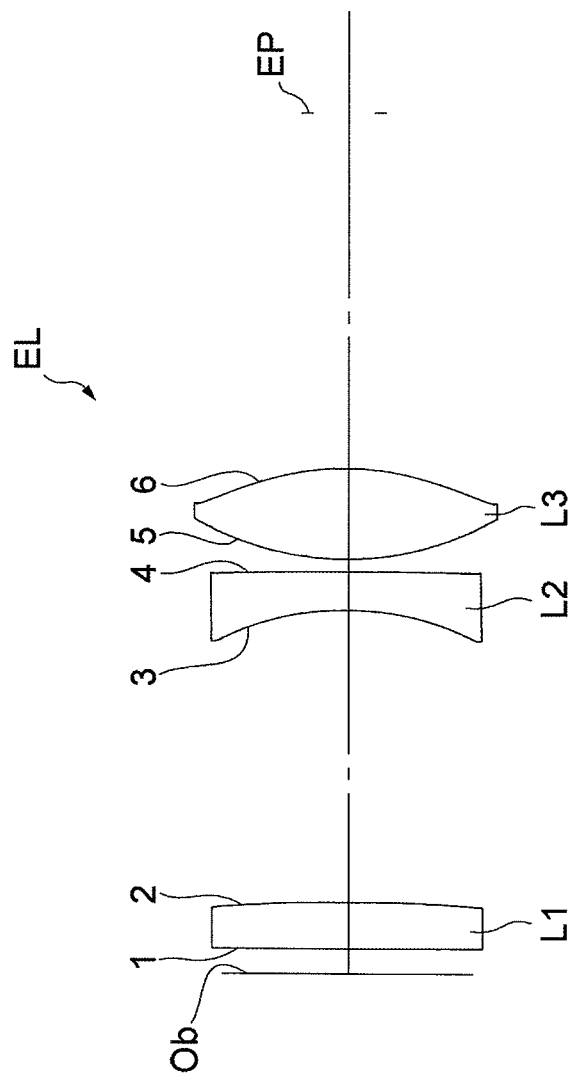
FIG. 5 is a cross-sectional view of an ocular optical system according to Third Example.

Third Example will now be described with reference to FIG. 5, FIG. 6 and Table 3. FIG. 5 is a cross-sectional view of an ocular optical system EL according to Third Example, when the diopter is −1 [m$^{-1}$]. The ocular optical system EL of Third Example has the same configuration of the ocular optical system EL of First Example, except for a part of the configuration as the first lens L1, therefore each component the same as First Example is denoted with a same reference symbol, for which detailed description is omitted. The first lens L1 of Third Example is a positive lens disposed near the image display element Ob in order to make the ocular optical system EL compact, while guaranteeing tele-centricity and sufficiently wide luminous flux.

Table 3 shows each data of Third Example. The surface numbers 1 to 6 in Table 3 correspond to surfaces 1 to 6 in FIG. 5. In Third Example, the lens surfaces of surface 3 and surface 6 are formed to be aspherical respectively.

TABLE 3

[General Data]

f1 = 152.1553
f2 = −25.8256
f3 = 13.6709
h = 6.3
TL = 24.1
fe = 22.24

[Lens Data]

| surface number | radius of curvature | surface distance | Abbe number | refractive index |
|---|---|---|---|---|
| element surface | 0 | 1.19 | | |
| 1 | 0 | 2.20 | 55.91 | 1.53110 |
| 2 | −80.8097 | 13.95 | | |
| 3* | −15.4973 | 1.84 | 23.26 | 1.63980 |
| 4 | −261.1676 | 0.60 | | |
| 5 | 14.8020 | 4.32 | 55.91 | 1.53110 |
| 6* | −12.8083 | 17.00 | | |

TABLE 3-continued

[Aspherical Data]

surface 3

κ = −0.50322, A4 = −2.4856E−04, A6 = −1.9770E−08,
A8 = 5.5301E−08, A10 = 0.0000E+00
surface 6

κ = 0.70400, A4 = 4.5294E−05, A6 = 2.1781E−06,
A8 = −5.8682E−09, A10 = 0.00000E+00

Figure 6:
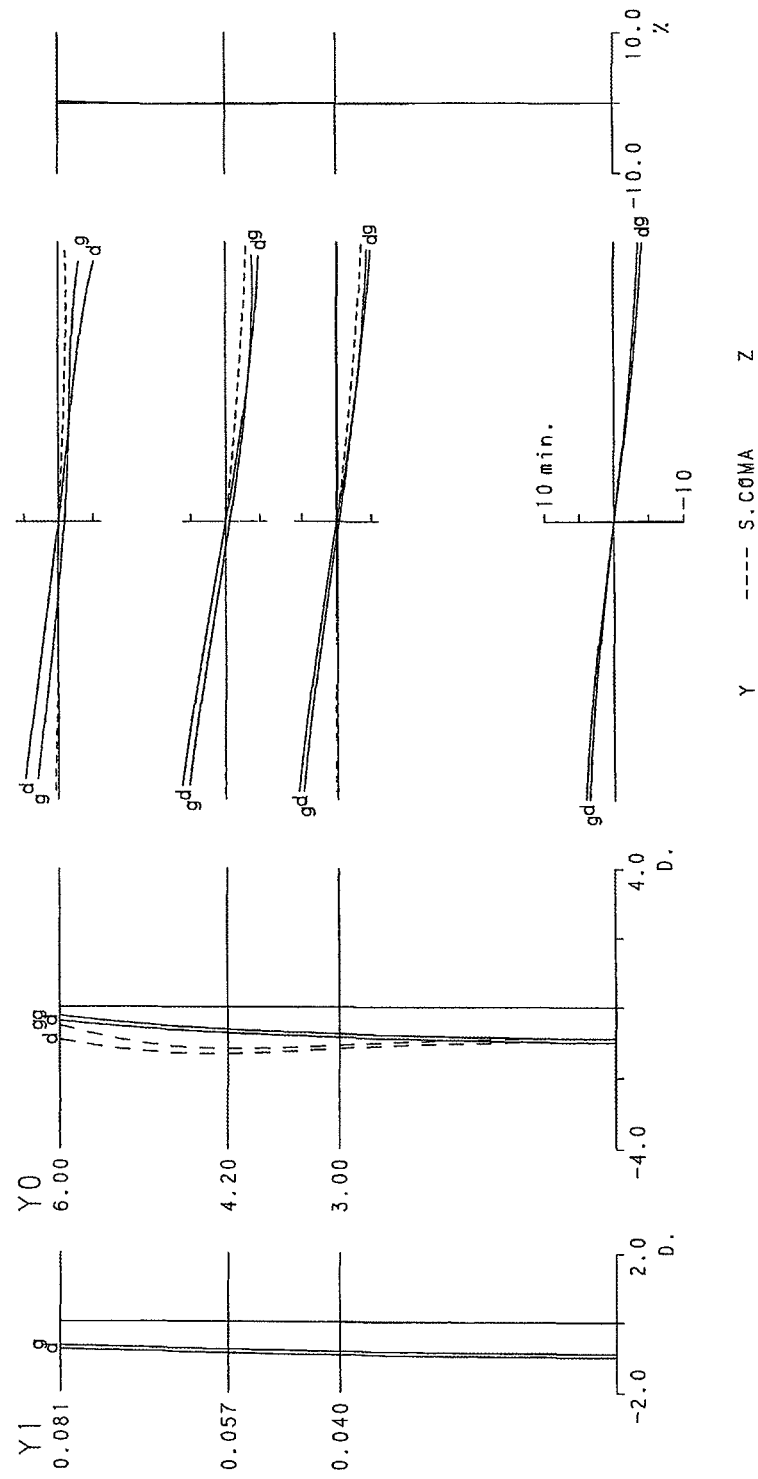
FIG. 6 are graphs showing various aberrations according to Third Example when the diopter is −1 [m$^{-1}$]

FIG. 6 are graphs showing various aberrations of the ocular optical system EL according to Third Example, when the diopter is −1 [M$^{-1}$]. As each graph showing aberrations clarifies, the ocular optical system according to Third Example has an excellent image forming performance, where various aberrations are ideally corrected. As a result, an excellent optical performance can be generated for the digital single-lens reflex camera CAM as well, by installing the ocular optical system EL of Third Example.

Example 4

Figure 7:
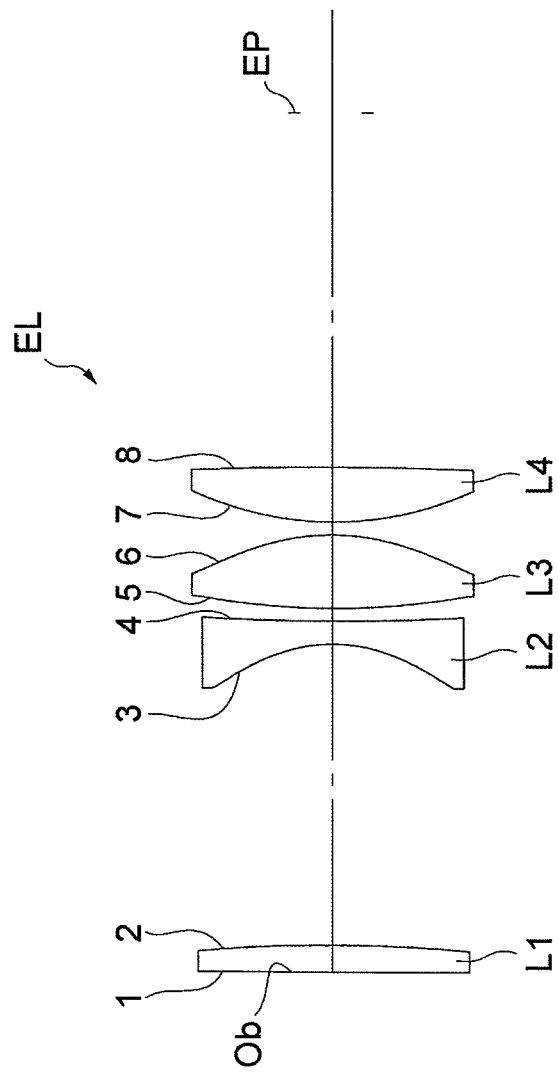
FIG. 7 is a cross-sectional view of an ocular optical system according to Fourth Example.

Fourth Example of the present invention will be described below with reference to FIG. 7, FIG. 8 and Table 4. FIG. 7 is a cross-sectional view of an ocular optical system EL according to Fourth Example, when the diopter is −1 [m$^{-1}$]. The ocular optical system EL according to Fourth Example comprises, in order from an image display element Ob: a first lens L1 which is a positive lens; a second lens L2 which is a negative lens; and a third lens L3 which is a positive lens, and the first lens L1 is disposed adjacent to the image display element Ob.

The first lens L1 is a positive lens which is cemented and integrated with the image display element Ob by a frame member (not illustrated), in order to make the ocular optical system EL compact, while guaranteeing tele-centricity and sufficiently wide luminous flux. The second lens L2 is a negative lens (meniscus lens) having a strong concave surface facing the image display element Ob, and the lens surface of the second lens L2 facing the image display element Ob is aspherical. The third lens L3 is a positive lens (convex lens) having a strong convex surface facing the eye point EP, in order to implement both high magnification and compactness, and the lens surface of the third lens L3 facing the eye point EP is aspherical. The fourth lens L4 is a positive lens (convex lens) having a strong convex surface facing the image display element Ob.

The first lens L1 is a glass lens, and the second to fourth lenses L2 to L4 are plastic lenses. Upon correcting the diopter, the distance between the first lens L1 and the second lens L2 is changed by the image display element Ob and the first lens L1 being fixed, and the second to fourth lenses L2 to L4 moving together along the optical axis.

Table 4 shows each data of Fourth Example. The surface numbers 1 to 8 in Table 4 correspond to surfaces 1 to 8 in FIG. 7. In Fourth Example, the lens surfaces of surface 3 and surface 6 are formed to be aspherical respectively.

TABLE 4

[General Data]

f1 = 114.9020
f2 = −11.8799
f3 = 15.7392
f4 = 27.5572
h = 6.3

TABLE 4-continued

TL = 24.07
fe = 23.76

[Lens Data]

| surface number | radius of curvature | surface distance | Abbe number | refractive index |
|---|---|---|---|---|
| element surface | 0 | 0.00 | | |
| 1 | 0 | 1.27 | 60.66 | 1.60311 |
| 2 | −69.2988 | 14.37 | | |
| 3* | −7.3996 | 1.10 | 30.33 | 1.58276 |
| 4 | 113.4125 | 0.60 | | |
| 5 | 36.1090 | 3.49 | 55.91 | 1.53110 |
| 6* | −10.5120 | 0.60 | | |
| 7 | 16.1118 | 2.64 | 55.91 | 1.53110 |
| 8 | −150.6600 | 17.00 | | |

[Aspherical Data]

surface 3

κ = −0.12321, A4 = 0.54536E−04, A6 = −0.39673E−05,
A8 = 0.14810E−06, A10 = 0.0000E+00 surface 6

κ = 1.36687, A4 = 0.27848E−03, A6 = −0.79828E−06,
A8 = 0.54046E−07, A10 = 0.00000E+00

Figure 8:
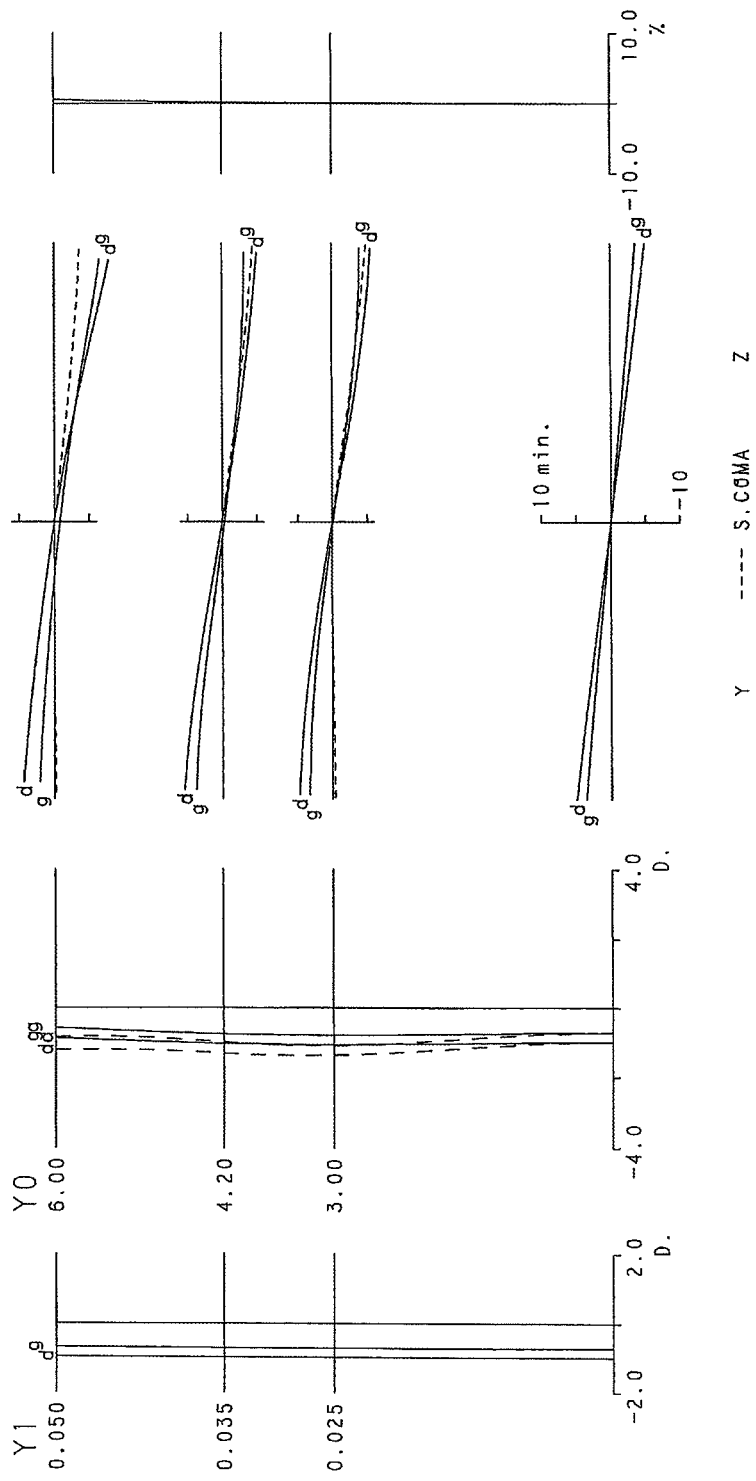
FIG. 8 are graphs showing various aberrations according to Fourth Example when the diopter is −1 [m$^{-1}$]

FIG. 8 are graphs showing various aberrations of the ocular optical system EL according to Fourth Example, when the diopter is −1 [m$^{-1}$]. As each graph showing aberrations clarifies, the ocular optical system according to Fourth Example has an excellent image forming performance, where various aberrations are ideally corrected. As a result, an excellent optical performance can be generated for the digital single-lens reflex camera CAM as well, by installing the ocular optical system EL of Fourth Example.

Table 5 shows conditional expression correspondence values according to each example.

TABLE 5

| | First Example | Second Example | Third Example | Fourth Example |
|---|---|---|---|---|
| Conditional expression(1) | 6.516 | 3.003 | 6.842 | 4.836 |
| Conditional expression(2) | 0.578 | 0.523 | 0.627 | 0.605 |
| Conditional expression(3) | 0.000 | 0.000 | 0.085 | 0.000 |
| Conditional expression(4) | 11.242 | 8.246 | 11.130 | 7.300 |
| Conditional expression(5) | 7.995 | 9.201 | 5.892 | 9.672 |
| Conditional expression(6) | 0.000 | 0.000 | 0.049 | 0.000 |
| Conditional expression(7) | 0.604 | 0.574 | 0.579 | 0.597 |
| Conditional expression(8) | 6.516 | 3.003 | 6.842 | 4.836 |
| Conditional expression(9) | 0.000 | 0.000 | 0.085 | 0.000 |
| Conditional expression(10) | 11.262 | 8.246 | 11.130 | 7.300 |
| Conditional expression(11) | 7.995 | 9.201 | 5.892 | 9.672 |

Thus each example satisfies each of the above conditional expressions respectively. According to each example, an ocular optical system EL and an optical apparatus (digital single-lens reflex camera CAM) which has an ideal optical performance can be implemented.

In the above embodiments, the image display element Ob and the first lens L1 are fixed, and the other lenses are moved together along the optical axis upon correcting the diopter, but the present invention is not limited to this, but the image display element Ob and the first lens L1 may be moved together to change the distance between the first lens L1 and the second lens L2.

In the above embodiments, the digital single-lens reflex camera CAM having the ocular optical system EL was described, but the present invention is not limited to this, but the present invention can be applied to any optical apparatus, including a video camera, if an ocular optical system for observing an image displayed on the image display element is adopted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ocular optical system for observing an image displayed on an image display element,
the system comprising, in order from the image display element:
a first lens which is a positive lens;
a second lens which is a negative lens; and
a third lens which is a positive lens, and
the following conditional expressions being satisfied:

$$2.50 < f1/fe < 8.00$$

$$0.52 < d12/fe < 0.80$$

where f1 denotes a focal length of the first lens, fe denotes a focal length of the ocular optical system, and d12 denotes a distance between the first lens and the second lens.

2. The ocular optical system according to claim 1, wherein the following conditional expression is satisfied:

$$0.00 \leq d0/d12 < 0.50$$

where d0 denotes a distance between the image display element and the first lens.

3. The ocular optical system according to claim 1, wherein the image display element and the first lens are cemented.

4. The ocular optical system according to claim 1, wherein the following conditional expression is satisfied:

$$5.00 < f1/f3 < 13.00$$

where f3 denotes a focal length of the third lens.

5. The ocular optical system according to claim 1, wherein the following expression is satisfied:

$$4.00 < (-1) \times (f1/f2) < 12.00$$

where f2 denotes a focal length of the second lens.

6. The ocular optical system according to claim 1, wherein the following conditional expression is satisfied:

$$0.00 \leq d0/TL < 0.10$$

where d0 denotes a distance between the image display element and the first lens, and TL denotes a distance from the image display element to a lens surface closest to the eye point.

7. The ocular optical system according to claim 1, wherein the following conditional expression is satisfied:

$$0.30 < d12/TL < 0.70$$

where TL denotes a distance from the image display element to a lens surface closest to the eye point.

8. The ocular optical system according to claim 1, wherein at least one of the second lens and the third lens has an aspherical surface.

9. The ocular optical system according to claim 1, wherein at least one of the second lens and the third lens is a plastic lens.

10. The ocular optical system according to claim 1, wherein the diopter is corrected by changing the distance between the first lens and the second lens.

11. An optical apparatus comprising: an objective lens; an imaging element which captures an image formed by the objective lens; an image display element which displays the image captured by the imaging element; and an ocular optical system for observing the image displayed on the image display element, the ocular optical system being the ocular optical system according to claim 1.

12. An ocular optical system for observing an image displayed on an image display element, the system comprising, in order from the image display element: a first lens which is a positive lens; a second lens which is a negative lens; and a third lens which is a positive lens, and the following conditional expressions being satisfied:

$$0.00 \leq d0/TL < 0.10$$

$$0.30 < d12/TL < 0.70$$

where d0 denotes a distance between the image display element and the first lens, d12 denotes a distance between the first lens and the second lens, and TL denotes a distance from the image display element to a lens surface closest to the eye point.

13. The ocular optical system according to claim 12, wherein the following conditional expression is satisfied:

$$2.50 < f1/fe < 8.00$$

where f1 denotes a focal length of the first lens, and fe denotes a focal length of the ocular optical system.

14. The ocular optical system according to claim 12, wherein the following conditional expression is satisfied:

$$0.00 \leq d0/d12 < 0.50.$$

15. The ocular optical system according to claim 12, wherein the image display element and the first lens are cemented.

16. The ocular optical system according to claim 12, wherein the following conditional expression is satisfied:

$$5.00 < f1/f3 < 13.00$$

where f1 denotes a focal length of the first lens, and f3 denotes a focal length of the third lens.

17. The ocular optical system according to claim 12, wherein the following conditional expression is satisfied:

$$4.00 < (-1) \times (f1/f2) < 12.00$$

where f1 denotes a focal length of the first lens, and f2 denotes a focal length of the second lens.

18. The ocular optical system according to claim 12, wherein at least one of the second lens and the third lens has an aspherical surface.

19. The ocular optical system according to claim 12, wherein at least one of the second lens and the third lens is a plastic lens.

20. The ocular optical system according to claim 12, wherein the diopter is corrected by changing the distance between the first lens and the second lens.

21. An optical apparatus comprising: an objective lens; an imaging element which captures an image formed by the objective lens; an image display element which displays the image captured by the imaging element; and an ocular optical system for observing the image displayed on the image display element, and the ocular optical system being the ocular optical system according to claim 12.

22. A method for manufacturing an ocular optical system for observing an image displayed on an image display element, the method comprising positioning, in order from the image display element, a first lens which is a positive lens, a second lens which is a negative lens, and a third lens which is a positive lens, so as to satisfy the following conditional expressions:

$$2.50 < f1/fe < 8.00$$

$$0.52 < d12/fe < 0.80$$

where f1 denotes a focal length of the first lens, fe denotes a focal length of the ocular optical system, and d12 denotes a distance between the first lens and the second lens.

23. The method for manufacturing the ocular optical system according to claim 22, wherein the following conditional expression is satisfied:

$$0.00 \leq d0/d12 < 0.50$$

where d0 denotes a distance between the image display element and the first lens.

24. The method for manufacturing the ocular optical system according to claim 22, wherein the image display element and the first lens are cemented.

25. The method for manufacturing the ocular optical system according to claim 22, wherein the following conditional expression is satisfied:

$$5.00 < f1/f3 < 13.00$$

where f3 denotes a focal length of the third lens.

26. The method for manufacturing the ocular optical system according to claim 22, wherein the following conditional expression is satisfied:

$$4.00 < (-1) \times (f1/f2) < 12.00$$

where f2 denotes a focal length of the second lens.

27. The method for manufacturing the ocular optical system according to claim 22, wherein the following conditional expression is satisfied:

$$0.00 \leq d0/TL < 0.10$$

where d0 denotes a distance between the image display element and the first lens, and TL denotes a distance from the image display element to a lens surface closest to the eye point.

28. A method for manufacturing an ocular optical system for observing an image displayed on an image display element, the method comprising positioning, in order from the image display element, a first lens which is a positive lens, a second lens which is a negative lens, and a third lens which is a positive lens, so as to satisfy the following conditional expressions:

$$0.00 \leq d0/TL < 0.10$$

$$0.30 < d12/TL < 0.70$$

where d0 denotes a distance between the image display element and the first lens, d12 denotes a distance between the first lens and the second lens, and TL denotes a distance from the image display element to a lens surface closest to the eye point.

29. The method for manufacturing the ocular optical system according to claim 28, wherein the following conditional expression is satisfied:

$$2.50 < f1/fe < 8.00$$

where f1 denotes a focal length of the first lens, and fe denotes a focal length of the ocular optical system.

30. The method for manufacturing the ocular optical system according to claim 28, wherein the following conditional expression is satisfied:

$$0.00 \leq d0/d12 < 0.50.$$

31. The method for manufacturing the ocular optical system according to claim 28, wherein the image display element and the first lens are cemented.

32. The method for manufacturing the ocular optical system according to claim 28, wherein the following conditional expression is satisfied:

$$5.00 < f1/f3 < 13.00$$

where f1 denotes a focal length of the first lens, and f3 denotes a focal length of the third lens.

33. The method for manufacturing the ocular optical system according to claim 28, wherein the following conditional expression is satisfied:

$$4.00 < (-1) \times (f1/f2) < 12.00$$

where f1 denotes a focal length of the first lens, and f2 denotes a focal length of the second lens.

* * * * *